US007212388B2

(12) United States Patent
Wizemann et al.

(10) Patent No.: US 7,212,388 B2
(45) Date of Patent: May 1, 2007

(54) DEVICE PROTECTING AN ELECTRONIC CIRCUIT

(75) Inventors: Thomas Wizemann, Ludwigsburg (DE); Stefan Josten, Remscheid (DE)

(73) Assignee: Robert Bosch GmbH, Stuttgart (DE)

( * ) Notice: Subject to any disclaimer, the term of this patent is extended or adjusted under 35 U.S.C. 154(b) by 46 days.

(21) Appl. No.: 10/492,958

(22) PCT Filed: Jul. 23, 2002

(86) PCT No.: PCT/DE02/02694

§ 371 (c)(1), (2), (4) Date: Apr. 19, 2004

(87) PCT Pub. No.: WO03/038257

PCT Pub. Date: May 8, 2003

(65) Prior Publication Data

US 2004/0252437 A1 Dec. 16, 2004

(30) Foreign Application Priority Data

Oct. 20, 2001 (DE) ................................ 101 52 252

(51) Int. Cl.
*H02H 3/20* (2006.01)
*H02H 9/04* (2006.01)
*H05F 3/00* (2006.01)
*B60C 19/08* (2006.01)

(52) U.S. Cl. ...................... 361/91.1; 361/216; 361/217

(58) Field of Classification Search ............... 361/91.1, 361/216, 217

See application file for complete search history.

(56) References Cited

U.S. PATENT DOCUMENTS

| | | | | |
|---|---|---|---|---|
| 4,862,311 | A | 8/1989 | Rust et al. | |
| 5,214,959 | A | 6/1993 | Moriguchi et al. | |
| 5,270,645 | A | 12/1993 | Bull et al. | |
| 5,399,099 | A * | 3/1995 | English et al. | 439/417 |
| 5,525,943 | A * | 6/1996 | Roethlingshoefer et al. | 333/185 |
| 5,544,000 | A | 8/1996 | Suzuki et al. | |
| 5,639,989 | A * | 6/1997 | Higgins, III | 174/35 MS |
| 5,745,324 | A | 4/1998 | Rubin et al. | |
| 5,803,430 | A | 9/1998 | Buchl | |
| 6,140,574 | A * | 10/2000 | Snyder | 174/35 R |
| 6,209,398 | B1 * | 4/2001 | Fowler et al. | 73/724 |
| 6,725,833 | B1 | 4/2004 | Irihune et al. | |

FOREIGN PATENT DOCUMENTS

| | | |
|---|---|---|
| DE | 42 41 020 | 6/1994 |
| DE | 43 34 963 | 4/1995 |
| EP | 0 736 682 | 10/1996 |
| JP | 4-171251 | 6/1992 |

* cited by examiner

*Primary Examiner*—Stephen W. Jackson
*Assistant Examiner*—Dharti H. Patel
(74) *Attorney, Agent, or Firm*—Walter Ottesen

(57) ABSTRACT

An arrangement for protecting an electronic circuit is suggested which is mounted in a housing and is insulated relative to the housing. At least one connection is provided with which the electronic circuit is connected to a pregiven potential. A voltage-dependent resistor is introduced between the housing and the at least one connection for protecting against ESD-pulses and EMV-irradiation.

5 Claims, 1 Drawing Sheet

DEVICE PROTECTING AN ELECTRONIC CIRCUIT

RELATED APPLICATION

This application is the national stage of PCT/DE 02/02694, filed Jul. 23, 2002, designating the United States and claiming priority from German patent application no. 101 52 252.5, filed Oct. 20, 2001, the entire contents of which are incorporated herein by reference.

FIELD OF THE INVENTION

The invention relates to an arrangement for protecting an electronic circuit (especially an electronic circuit connected to an actuating element of a throttle flap of an internal combustion engine) against electrostatic pulses and electromagnetic irradiation (ESD-pulses (ESD=electrostatic discharge); EMV-irradiation (EMV=electromagnetic compatibility)).

BACKGROUND OF THE INVENTION

A component for an actuator for a throttle flap of a drive motor is known from DE 42 41 020 A1. The component includes the following: a drive motor mounted in a housing; a throttle flap mounted on a shaft; and, a position sensor for detecting the position of the throttle flap. Position sensors and drive motor are connected to the throttle flap shaft. The drive signals are supplied to the component via plug-and-socket connections and the determined position signals are outputted via the plug-and-socket connections. The position sensor is at least one potentiometer. The component is mounted in the intake manifold of the internal combustion engine.

Only the position sensor itself is integrated into the housing of the throttle flap actuator in the known solution. The detected voltage raw signals are transmitted to a control unit which evaluates the same. In future, however, also electronic components are increasingly built into such an actuator housing, for example, evaluation electronics for evaluating and/or digitally converting the sensor signal, especially, in contactless position sensors. This applies not only to a throttle flap actuator but also to other aggregates in connection with the control of an internal combustion engine (for example, an accelerator pedal unit, see, for example, DE-A 43 34 963).

The electronic circuits, which supply measurement signal values with a pregiven accuracy (in dependence upon which a control function for engine control, brake control or vehicle control is computed), must be protected against EMV-irradiation and ESD-pulses.

It is known from U.S. Pat. No. 5,803,430 to output electrostatic discharges via high-ohmage resistors from the throttle housing to the ground of the DC-motor. This variation is not suitable for our case because the high-ohmage resistors are not suited for EMV and ESD protection.

SUMMARY OF THE INVENTION

With the circuit of a voltage-dependent resistor (varistor) or a similar electronic component between the housing of the aggregate and a suitable connection of the electronic circuit (for example, of the ground terminal of the electronic circuit), this circuit is effectively protected against ESD pulses and EMV irradiation.

In an advantageous manner, electrostatic charges of the housing of the aggregate, which arise, for example, by airflow, are additionally conducted away with this component.

In an especially advantageous manner, the protection of the electronic circuit, especially of an integrated circuit loop, is made available with only one component. In this way, also several ICs, which are available via a common connection, for example, a common ground connection, are protected in common with a component.

In addition to the effective protection of the circuit, the lower number of components effect also an improvement of the availability and of the complexity because, with the low number of electrical components, the danger of malfunction and the amount of the cost is reduced.

BRIEF DESCRIPTION OF THE DRAWINGS

The invention will be described in greater detail with respect to the embodiments shown in the drawing.

DESCRIPTION OF THE PREFERRED EMBODIMENTS OF THE INVENTION

Figure 1:
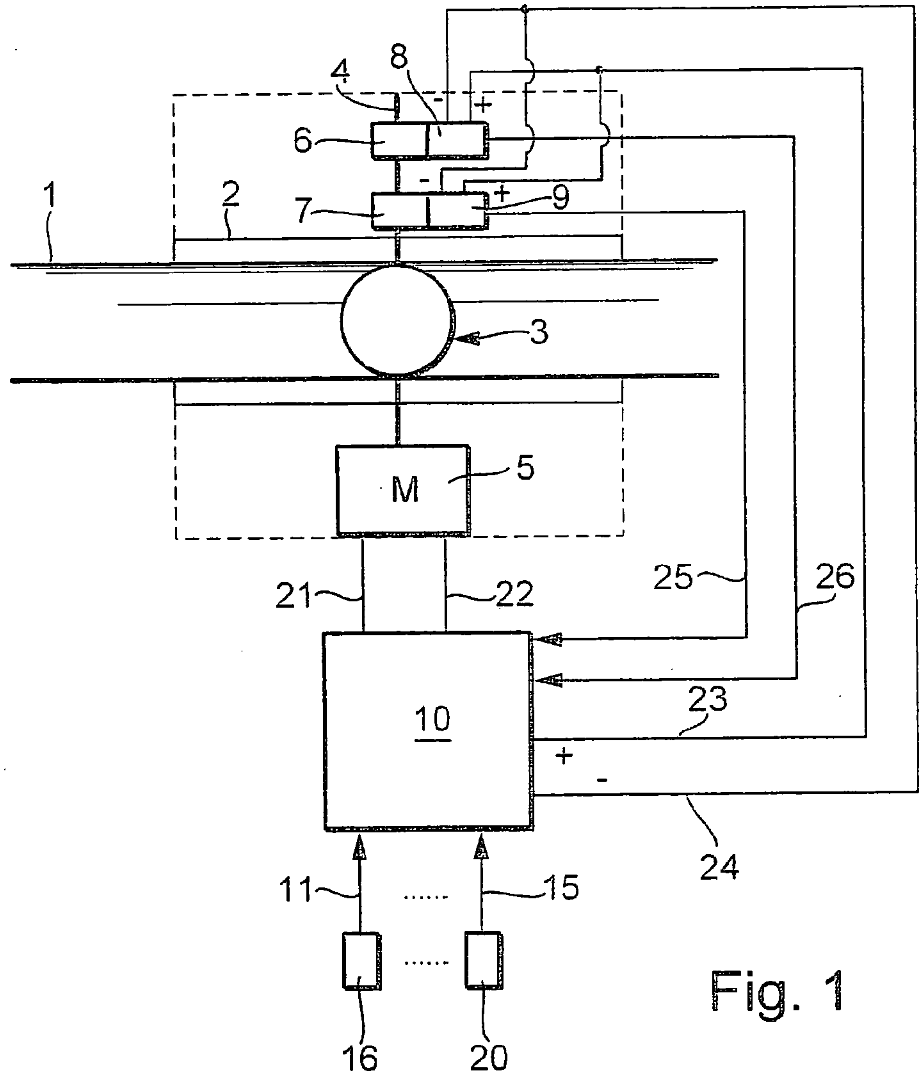
FIG. 1 shows a preferred embodiment of a throttle flap actuator in whose housing, inter alia, an electronic circuit (for example, an evaluation electronic of a position sensor) is accommodated.

FIG. 1 shows an intake manifold 1 wherein a throttle flap assembly 2 is built in. The housing of this throttle flap assembly comprises metal. The throttle flap assembly is journalled so as to be electrically insulated, for example, with respect to the intake manifold (when the intake manifold is made of plastic), internal combustion engine or vehicle chassis.

The throttle flap assembly includes a throttle flap 3 which is attached to a shaft 4. This shaft 4 is connected to a drive shaft of an electric motor 5 which rotates the drive shaft, and therewith the throttle flap 3, by rotation in one or the other direction. In this way, the opening cross section of the intake manifold is changed. Furthermore, at least one position sensor (6, 7) is mounted on the shaft as shown schematically in FIG. 1. These sensors detect the position of the shaft 4 and therefore the position of the throttle flap 3 either potentiometrically or contactlessly (for example, in accordance with the Hall principle). The position sensor (6, 7) includes an electronic circuit (8, 9) which evaluates the measurement signal detected by the sensor. The electric circuit is electrically insulated relative to the housing of the throttle flap assembly.

In the preferred embodiment, the electronic circuits are configured as integrated circuits and, in another embodiment, also as discrete circuits. Two position sensors 6 and 7 are provided in the preferred embodiment.

Furthermore, an electronic control unit 10 is provided which includes, in one embodiment, at least one microcomputer which, inter alia, outputs drive signals for actuating the electric motor 5 corresponding to its implemented program in accordance with measurement signals supplied from measuring devices 16 to 20 via input lines 11 to 15. In other embodiments, the control unit 10 includes no microcomputer and, instead, includes other means for forming drive signals. These drive signals are conducted to the electric motor 5 via the control lines 21 and 22. The electronic circuits 8 and 9 and, if required, the sensors 6 and 7, are supplied with energy by the control unit 10 via lines 23 and 24, respectively. In the embodiment shown, the line 23 defines the connection to the positive pole of a voltage source while the line 24 represents a ground connection. Plus pole and ground connection correspond to the corresponding connections of the control unit 10. The processed measurement signals of the sensors 6 and 7 are outputted by the electronic circuits 8 and 9, respectively, to the electronic control unit 10 via lines 25 and 26, respectively. The control unit 10 considers these signals in the context of the control of the throttle flap 3 or other functions. Sensors and electronic circuits are electrically insulated with respect to the housing of the throttle flap actuator.

In other embodiments, the ground connection and/or the positive connection are not made by the control unit, instead, they are made by other components or directly from a voltage source.

Because of the described configuration, it is necessary to protect the electronic circuits 8 and 9 against electrostatic pulses and electromagnetic irradiation. For this purpose, an electric component such as a voltage-dependent resistor is introduced between the housing of the throttle flap assembly and a suitable connector, for example, the ground connection of at least one electronic circuit. The voltage-dependent resistor is, for example, a varistor, or components such as diodes, dischargers, condensers. Protection exclusively against ESD-pulses is achieved with two Zener diodes connected in series in mutually opposite directions.

Figure 2:
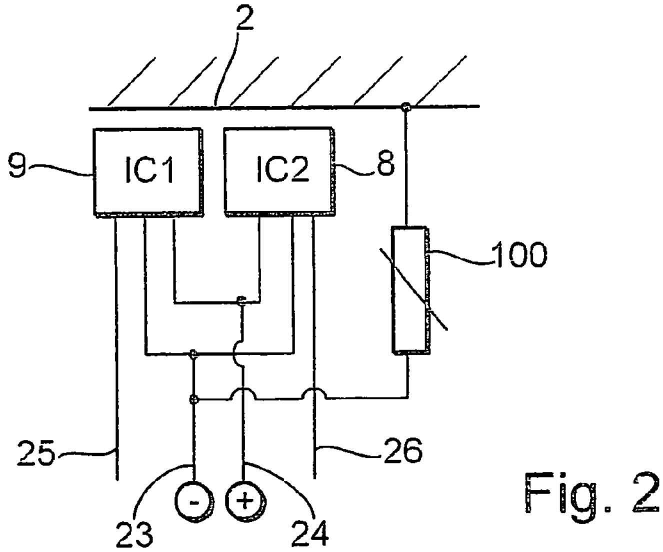
FIG. 2 shows a preferred embodiment of a circuit for protecting such an electronic circuit.

An example of this is shown in FIG. 2. There, the sensors 6 and 7 as well as the electronic circuits 8 and 9 are shown as integrated circuits IC1 and IC2 and are connected in the manner shown in FIG. 1. A voltage-dependent resistor 100 is introduced between the ground lead 23 of the electronic circuits and the housing 2 of the throttle flap assembly. Electrostatic charges of the housing 2 are conducted to ground via the varistor 100 while electrostatic pulses and electromagnetic irradiation are conducted away into the electronic circuits via the varistor 100.

The arrangement of the invention is described above with respect to the preferred embodiment of a throttle flap actuator. In other applications, one can proceed in the same manner in an electronic circuit which is built into a housing of an aggregate so as to be electrically insulated and which does not use the housing of the aggregate as a ground connection.

In lieu of two integrated circuits as described in the preferred embodiment, only one integrated circuit or three and more circuits are used in other embodiments.

The invention claimed is:

1. An arrangement for protecting an electronic circuit built into a housing and said electronic circuit being electrically insulated relative to said housing, the arrangement comprising:

a source for providing a pregiven potential;

a connection leading to said electronic circuit for connecting said electronic circuit to said pregiven potential;

at least one electric component connected between said housing and said connection for conducting charges of said housing and/or irradiation away from the electronic circuit; and, said electric component being one of the following: a voltage-dependent resistor (varistor), a diode and a discharger.

2. The arrangement of claim 1, wherein said housing is the housing of an electric throttle flap actuator of an internal combustion engine; and, said electronic circuit is an evaluation circuit for a position sensor.

3. The arrangement of claim 2, wherein said pregiven potential is a ground potential.

4. The arrangement of claim 3, wherein said ground potential is the ground potential of a control system for controlling the internal combustion engine.

5. The arrangement of claim 2, wherein said electronic circuit functions for evaluating measurement signals from sensors which detect potentiometrically or contactlessly the position of the throttle flap.

* * * * *